US012594579B2

(12) United States Patent
Litton et al.

(10) Patent No.: US 12,594,579 B2
(45) Date of Patent: Apr. 7, 2026

(54) ENVIRONMENTAL BARRIER COATING AND METHOD OF REPAIRING THE SAME

(71) Applicant: RAYTHEON TECHNOLOGIES CORPORATION, Farmington, CT (US)

(72) Inventors: David A. Litton, West Hartford, CT (US); James T. Beals, West Hartford, CT (US); Richard Wesley Jackson, III, Mystic, CT (US); Xia Tang, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 733 days.

(21) Appl. No.: 17/832,050

(22) Filed: Jun. 3, 2022

(65) Prior Publication Data

US 2023/0390801 A1     Dec. 7, 2023

(51) Int. Cl.
| | |
|---|---|
| *B32B 9/00* | (2006.01) |
| *B05D 3/12* | (2006.01) |
| *B05D 5/00* | (2006.01) |
| *C04B 35/80* | (2006.01) |
| *C04B 41/45* | (2006.01) |

(Continued)

(52) U.S. Cl.
CPC .............. *B05D 5/005* (2013.01); *B05D 3/12* (2013.01); *C04B 35/80* (2013.01); *C04B 41/4539* (2013.01); *C04B 41/4572* (2013.01); *C04B 41/52* (2013.01); *C04B 41/89* (2013.01); *F01D 5/288* (2013.01); *F05D 2230/80* (2013.01);

(Continued)

(58) Field of Classification Search
CPC .......... B05D 5/005; B05D 3/12; C04B 35/80; C01B 41/4539; C01B 41/4572; C01B 41/52; C01B 41/89; F01D 5/288; F05D 2230/90; F05D 2300/6033
USPC ........................................................ 428/408
See application file for complete search history.

(56) References Cited

U.S. PATENT DOCUMENTS

| | | | |
|---|---|---|---|
| 8,221,825 B2 | 7/2012 | Reitz et al. | |
| 9,384,512 B2 | 7/2016 | McClements, IV | |

(Continued)

FOREIGN PATENT DOCUMENTS

| | | | | |
|---|---|---|---|---|
| CN | 101978005 A | * | 2/2011 | |
| CN | 104010762 A | * | 8/2014 | |

(Continued)

OTHER PUBLICATIONS

European Search Report for European Patent Application No. 23177040.5 dated Oct. 19, 2023.

*Primary Examiner* — Daniel H Miller

(74) *Attorney, Agent, or Firm* — Carlson, Gaskey & Olds, P.C.

(57) ABSTRACT

A method of repairing a coating on an article according to an exemplary embodiment of this disclosure, among other possible things includes defining a work area surrounding a discontinuity in the coating, the coating including undisturbed bond coat and undisturbed top coat; removing coating material within the work area; applying a slurry containing bond coat constituents in a carrier fluid to the work area; curing the slurry to form a repaired bond coat; applying a slurry containing top coat constituents in a carrier fluid to the work area; and curing the slurry to form a repaired top coat. A method of repairing a coating on an article and an article are also disclosed.

19 Claims, 4 Drawing Sheets

(51) Int. Cl.
    *C04B 41/52* (2006.01)
    *C04B 41/89* (2006.01)
    *F01D 5/28* (2006.01)
(52) U.S. Cl.
    CPC .. *F05D 2230/90* (2013.01); *F05D 2300/6033* (2013.01)

(56) References Cited

U.S. PATENT DOCUMENTS

| | | | |
|---|---|---|---|
| 10,094,236 | B2 | 10/2018 | Luthra |
| 11,167,312 | B2 | 11/2021 | Overholser |
| 2019/0375689 | A1 | 12/2019 | Saha et al. |

FOREIGN PATENT DOCUMENTS

| | | | |
|---|---|---|---|
| EP | 2236648 | | 10/2010 |
| JP | 5705627 | B2 * | 4/2015 |
| KR | 100342019 | B1 * | 9/2002 |
| WO | 2020036713 | | 2/2020 |

* cited by examiner

400

DEFINE A WORK AREA SURROUNDING A DISCONTINUITY — 402

REMOVE MATERIAL WITHIN THE WORK AREA — 404

APPLY SLURRY CONTAINING BOND COAT CONSTITUENTS TO THE WORK AREA — 406

CURE THE SLURRY — 408

APPLY SLURRY CONTAINING TOP COAT CONSTITUENTS TO THE WORK AREA — 410

CURE THE SLURRY — 412

SINTER THE REPAIR — 414

ENVIRONMENTAL BARRIER COATING AND METHOD OF REPAIRING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include a protective barrier coating.

SUMMARY

A method of repairing a coating on an article according to an exemplary embodiment of this disclosure, among other possible things includes defining a work area surrounding a discontinuity in the coating, the coating including undisturbed bond coat and undisturbed top coat; removing coating material within the work area; applying a slurry containing bond coat constituents in a carrier fluid to the work area; curing the slurry to form a repaired bond coat; applying a slurry containing top coat constituents in a carrier fluid to the work area; and curing the slurry to form a repaired top coat.

In a further example of the foregoing, the removing step includes abrading the work area.

In a further example of any of the foregoing, wherein the repaired bond coat has the same composition as the undisturbed bond coat.

In a further example of any of the foregoing, wherein the repaired bond coat has a different than as the undisturbed bond coat.

In a further example of any of the foregoing, the undisturbed bond coat and the repaired bond coat comprise matrix material, gettering particles, and diffusive particles.

In a further example of any of the foregoing, the repaired bond coat contains a higher concentration of diffusive particles than the undisturbed bond coat.

In a further example of any of the foregoing, the repaired top coat has a different composition than the undisturbed top coat.

In a further example of any of the foregoing, the method includes sintering the repaired bond coat and the repaired top coat.

In a further example of any of the foregoing, the article is a component of a gas turbine engine, and the sintering occurs during operation of the gas turbine engine.

In a further example of any of the foregoing, the sintering occurs at temperatures of at least about 1260 degrees C. (2300 degrees F.).

In a further example of any of the foregoing, the method also includes masking the article with masking material having an opening corresponding to the work area after the defining step.

In a further example of any of the foregoing, the masking material includes pre-cut masking material with a pre-cut opening. The method also includes selecting the pre-cut masking material to accommodate the size of the discontinuity.

In a further example of any of the foregoing, the step of applying the slurry containing bond coat constituents, the step of applying the slurry containing top coat constituents, or both, includes pressing the slurry into the article.

In a further example of any of the foregoing, the method also includes comprising the step of evaluating the coating to determine a thickness of the undisturbed bond coat, the undisturbed top coat, or both prior to the step of applying the slurry containing bond coat constituents.

A method of repairing a coating on an article according to an exemplary embodiment of this disclosure, among other possible things includes defining a work area surrounding a discontinuity in the coating, the coating including undisturbed bond coat and undisturbed top coat, and the discontinuity being in the top coat; removing top coat material within the work area to reveal undisturbed bond coat; applying a slurry containing top coat constituents in a carrier fluid to the work area over the undisturbed bond coat; and curing the slurry to form a repaired top coat.

In a further example of the foregoing, the repaired top coat has a different composition as the undisturbed top coat.

In a further example of any of the foregoing, the method also includes masking the article with masking material having an opening corresponding to the work area after the defining step.

In a further example of any of the foregoing, the method also includes sintering the repaired top coat.

In a further example of any of the foregoing, the method also includes the step of evaluating the coating to determine a thickness of the undisturbed top coat to the step of applying the slurry containing bond coat constituents.

An article according to an exemplary embodiment of this disclosure, among other possible things includes a ceramic matrix composite substrate and a coating disposed on the substrate. The coating includes an undisturbed bond coat including a matrix, gettering particles dispersed in the matrix, and diffusive particles dispersed in the matrix, and an undisturbed top coat disposed on the bond coat. The coating includes a repair, the repair including repaired bond coat continuous with the undisturbed bond coat and repaired top coat continuous with the undisturbed top coat, and wherein the repaired bond coat contains a higher concentration of diffusive particles than the undisturbed bond coat.

BRIEF DESCRIPTION OF THE DRAWINGS

FIG. 4 schematically illustrates a method of repairing the discontinuity of FIG. 3a.

DETAILED DESCRIPTION

Figure 1:
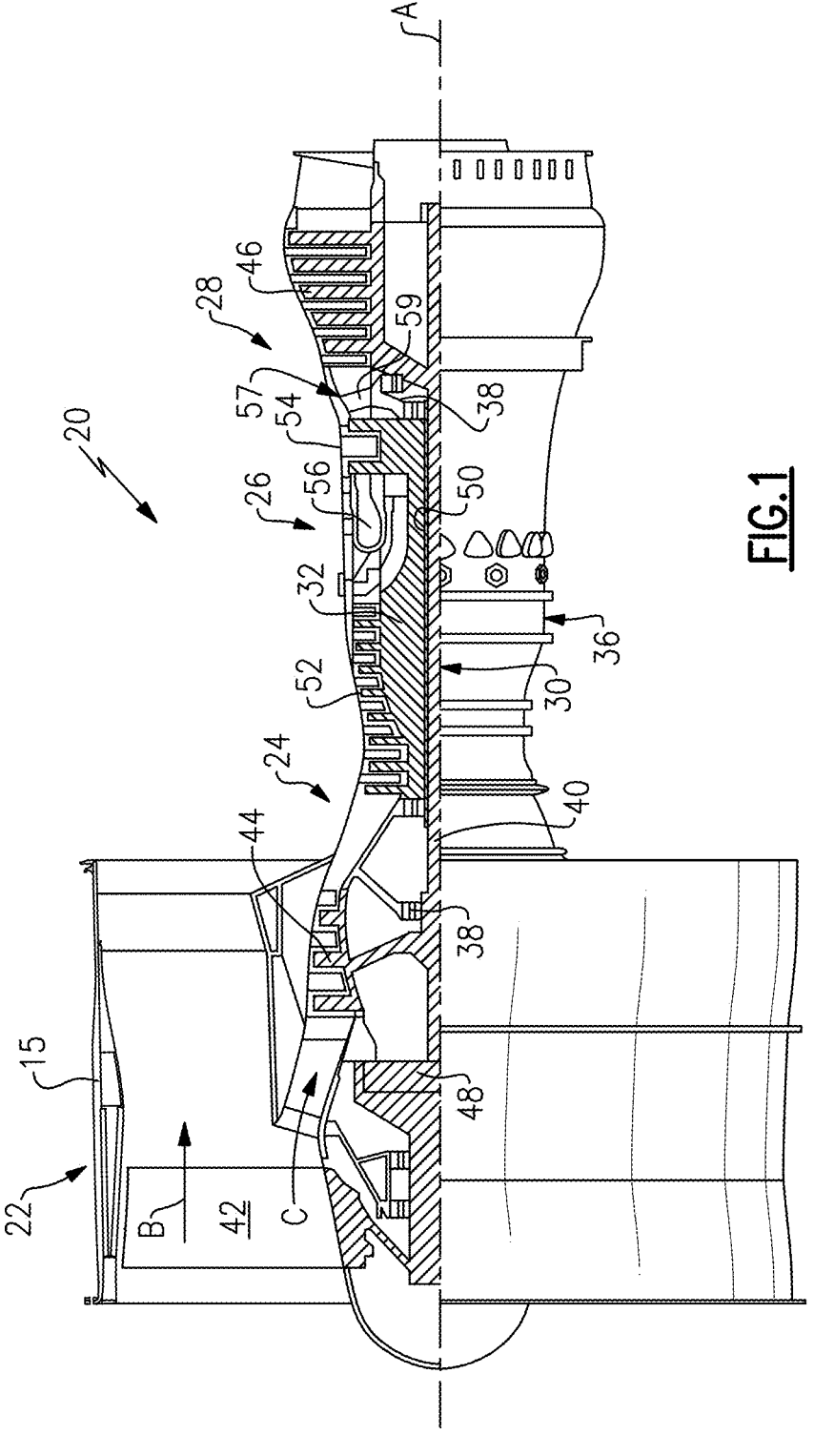
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram \ ° \ R)/(518.7 \ ° \ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
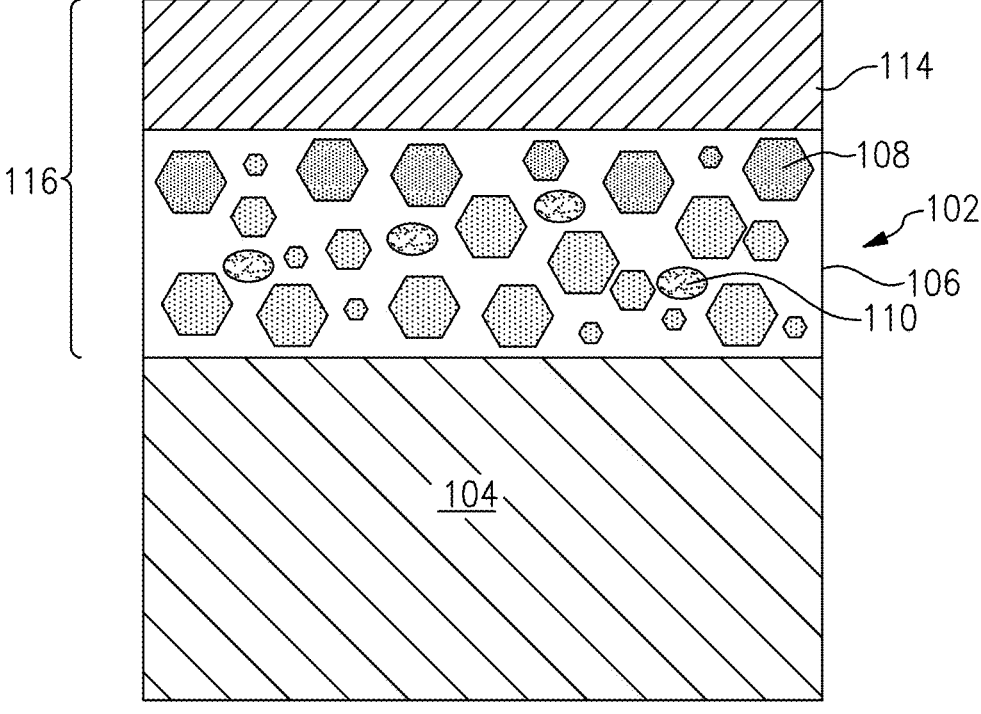
FIG. 2 illustrates an article for the gas turbine engine of claim 1 with a coating.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

In some examples, a ceramic-based top coat 114 is interfaced with the bond coat 102. As an example, the ceramic-based top coat 114 can include one or more layers of an oxide-based material. The oxide-based material can be, for instance, hafnium-based oxides or yttrium-based oxides (such as hafnia, hafnium silicate, yttrium silicates, yttria stabilized zirconia or gadolinia stabilized zirconia), calcium aluminosilicates, mullite, barium strontium aluminosilicate, or combinations thereof, but is not limited to such oxides.

The top coat 114 and bond coat 102 together form a barrier coating 116 for the substrate 104. In some examples, the bond coat 102 is between about 0.005 and 0.009 inches (0.127 to 0.229 mm) thick and the top coat 114 is about 0.005 inches (0.127 mm) thick.

Additionally, it should be understood that the bond coat 102 may comprise more than one layer, where each of the layers include combinations of gettering particles 108 and/or diffusive particles 110 in matrix 106. Likewise the topcoat 114 can comprise multiple layers of the same or different materials.

The bond coat 102 may be deposited onto the substrate 104 by any known method, such as air plasma spray or slurry deposition followed by sintering/curing. The top coat 114 may be deposited onto the bond coat 102 by any known method, such as air plasma spray.

One particular article 100 includes a substrate of silicon carbide fibers or other reinforcements in a silicon carbide matrix. In this example, the bond coat 102 includes silicon dioxide matrix 106, silicon oxycarbide gettering particles 108, BMAS diffusive particles 110, and the top coat 114 includes hafnium silicate.

The barrier coating 116 may wear and exhibit discontinuities over the lifetime of the article 100. For instance, local spalls can occur in either or both of the bond coat 102 and the top coat 114. These discontinuities can result in exposed areas of the bond coat 102 and/or substrate 104. Accordingly, there is a need to repair the barrier coating 116 to extend the lifetime of the article 100.

Figure 3A:
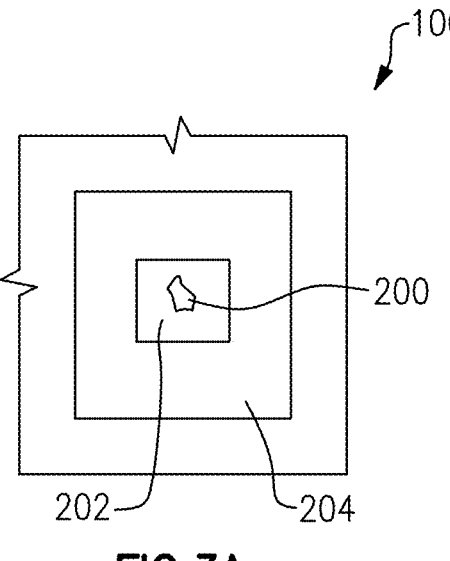
FIG. 3A schematically illustrates the article of FIG. 2 with a discontinuity.
Figure 3B:
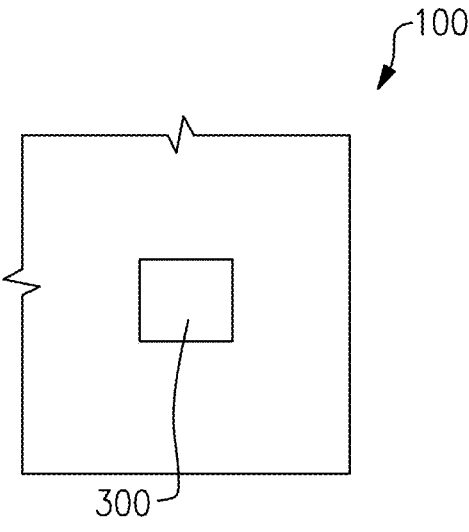
FIG. 3B schematically illustrates the article of FIG. 2 with a repair.
Figure 3C:
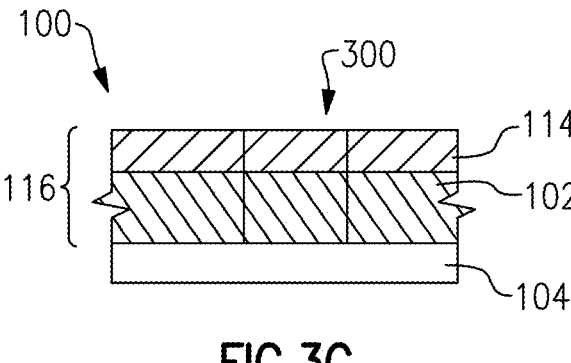
FIG. 3C shows a repaired article.
Figure 4:
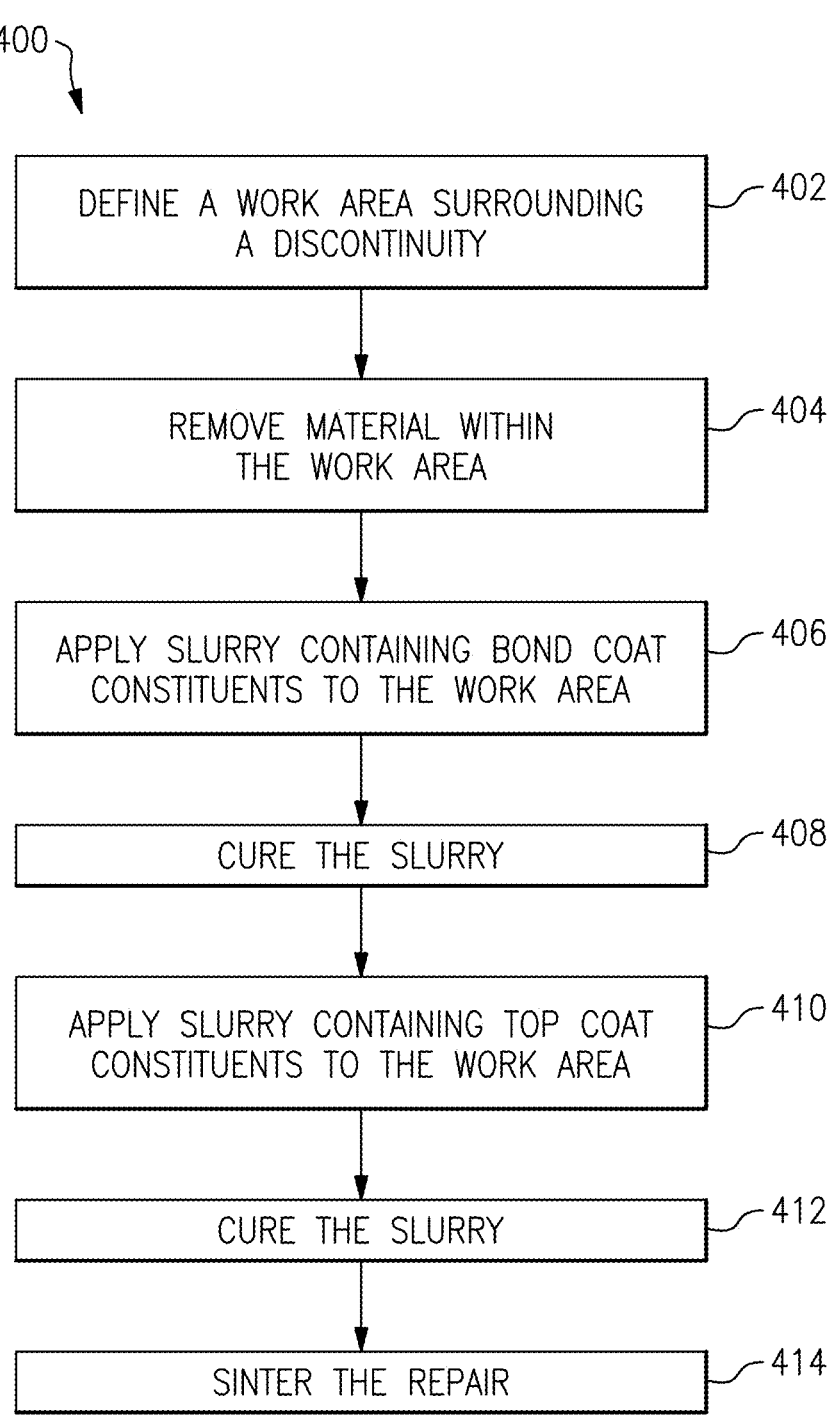

FIG. 3A illustrates an article with a discontinuity 200 in the bond coat 116. FIG. 4 illustrates an example method 400 for repairing an article 100 with barrier coating 116. FIGS. 3B and 3C illustrate an article 100 with a repair 300 made according to the method 400.

In step 402, a work area 202 surrounding the discontinuity 200 is defined. In one example, the work area 202 is defined so that it is about 0.25-about 0.5 inches (6.35-12.7 mm) larger than a longest dimension of the discontinuity 200. The work area 202 can be round or square, or can have another geometry suitable to accommodate the discontinuity 200.

In optional step 402, the area surrounding the work area 202 is masked with a masking material 204 having an opening corresponding to the work area 202. In one example, the masking is by tape or another suitable material. The masking material 204 covers enough of the article 100 so that the repair can be performed according to the method 400 without disrupting undisturbed areas of the barrier coating 116. In some particular examples, the masking material 204 is a pre-cut tape with a pre-cut opening corresponding to the work area 202. In this example, the pre-cut masking material 204 is selected to accommodate the size of the discontinuity 200.

In step 404, material is removed from the substrate 104. The removal can be by any suitable method, but generally includes abrasion such as by grit blasting with silicon carbide, dry ice, or another grit, laser ablation, or plasma etching. Picks or other tools may also be used to remove material. In an example where the discontinuity 200 is in both the bond coat 102 and the top coat 114, remaining bond coat 102 and top coat 114 are both removed from the work area 202 to reveal the substrate 104. In an example where the discontinuity 200 is only in the top coat 114, only the top coat 114 may be removed. The removal step can also remove dirt or other matter within the work area 202.

In optional step 406, the work area is evaluated in a non-destructive way to determine the thickness of the surrounding undisturbed barrier coating 116, and in examples where both the bond coat 102 and the top coat 114 both include the disruption 200, the thickness of each of the bond coat 102 and the top coat 114. The evaluation can be by any known technique, such as optical profilometry or an imaging technique such as micro-CT (micro-computed tomography).

For examples where the bond coat 102 contains the discontinuity 202, in step 408, a slurry comprising bond coat 102 constituents (e.g., matrix 106, gettering particles 108, and diffusive particles 108) in a carrier fluid is prepared and applied to the work area 202. In one example, the slurry is in the form of a thick paste (e.g., the slurry has a high viscosity and high solids load). For instance, the solids load may be greater than about 50% by volume. In this example, the slurry can be applied manually or by a robot, such as a force-sensing robot, in some examples. During or after the applying, the slurry can be pressed onto the substrate 104 by the application of force. In another example, the slurry has a lower viscosity suitable for spraying, painting, or dipping, and is applied by one of these methods.

In one example, the slurry is applied such that it has a thickness that is about the same as the thickness of the surrounding undisturbed bond coat 102 as determined in optional step 406. In a particular example, the optional determining step 406 is repeated after application of the slurry to determine the thickness of the slurry.

In one example, the slurry contains bond coat constituents that match the constituents of the undisturbed bond coat 102 on the article. In other examples, however, the slurry may contain different matrix 106 material, gettering particles 108, and/or diffusive particles 110. In one particular example, the slurry contains the same gettering particles 108 as the undisturbed bond coat 102, and the same or different matrix 106 material and diffusive particles 110. In another particular example, the slurry contains a higher concentration of diffusive particles 110 than the undisturbed bond coat 102. The diffusive particles 110 in the slurry act as a sintering aid which lowers the time and/or temperature required to sinter the slurry to form bond coat 102 in subsequent steps of the method 400 and improve densification of the repair 300, discussed in more detail below. In a particular example, the slurry contains about 75% silicon carbide, about 20% silicon dioxide, and about 5% BMAS by weight of solids (not including the carrier fluid). The slurry may also include binders and/or dispersants as are well known in the art. In addition, the slurry may also include sintering aids other than diffusive particles 110 such as glasses or other sintering aids that are well known in the art.

In one example, the slurry has a multimodal particle size distribution. The multimodal distribution improves the solids loading of the slurry and improves packing of the bond coat 102 constituents onto the article 100 when the slurry is applied.

In step 410, the slurry is cured to form a repaired bond coat 102 continuous with the undisturbed bond coat 102 on the article 100. In one particular example, the slurry is cured at about 200 degrees F. for about 5 minutes.

In some examples, the slurry is dried prior to the curing step 410 in air, at about room temperature. This drying step improves handling of article 100 during the repair and for subsequent steps of them method 400.

In step 412, a slurry containing top coat 114 constituents in a carrier fluid is prepared and applied to the work area 202. In one example, the slurry is in the form of a thick paste (e.g., the slurry has a high viscosity and high solids load). For instance, the solids load may be greater than about 50% by volume. The slurry can be applied manually or by a robot, such as a force-sensing robot, in some examples. During the applying, the slurry can be pressed onto the bond coat 102 by the application of force. In another example, the slurry has a lower viscosity suitable for spraying, painting, or dipping, and is applied by one of these methods.

In an example where both the bond coat 102 and the top coat 114 include a discontinuity 200, the slurry in step 412 is applied over the bond coat 102 from steps 408 and 410. In an example where only the top coat 114 includes a discontinuity 200, steps 408 and 410 are not performed and the method 400 continues to step 412 after optional step 406. In this example, the slurry is applied over the undisturbed bond coat 102.

In one example, the slurry is applied such that it has a thickness that is about the same as the thickness of the top coat 114 as determined in optional step 406. In a particular example, the optional determining step 406 is repeated after application of the slurry to determine the thickness of the slurry.

In one example, the slurry contains top coat constituents that match the constituents of the undisturbed top coat 114 on the article. In other examples, however, the slurry may contain different constituents. In a particular example, the slurry contains hafnium silicate particles. The slurry may also include binders and/or dispersants as are well known in the art. In addition, the slurry may also include sintering aids such as diffusive particles 110, glasses or other sintering aids that are well known in the art. The sintering aids lower the time and/or temperature required to sinter the slurry to form top coat 114 in subsequent steps of the method 400 and improve densification of the repair 300, discussed in more detail below.

In one example, the slurry has a multimodal particle size distribution. The multimodal distribution improves the solids loading of the slurry and improves packing of the top coat constituents onto the article 100 when the slurry is applied.

In step 414, the slurry is dried to form a repaired top coat 114 continuous with the undisturbed top coat 114 on the article 100. In one particular example, the slurry is cured at about 200 degrees C. (392 degrees F.) for about 5 minutes.

In some examples, the slurry is dried prior to the curing step 414 in air, at about room temperature. This drying step improves handling of article 100 during the repair and for subsequent steps of them method 400.

In step 416, the repair is sintered to form the repair 300 which is continuous with the undisturbed barrier layer 116 on the article 100. The repair 300 may be indistinguishable from the barrier layer 116 after the sintering step 416, in some examples. The temperature and time for the sintering step depends on the composition of the slurry. For instance, sintering aids lower the curing temperature requirements for repair 300. In some examples, the sintering occurs at temperatures of at least about 1260 degrees C. (2300 degrees F.). In this example the sintering time and temperature are suitable for on-wing repairs, meaning the article 100 need not be disassembled from the engine 20 to perform the method 400. In a particular example, the sintering is performed for 1 hour at 1482 degrees C. (2700 degrees F.) in air to sinter and density the repair 300 and to adhere the repair 300 to the substrate 104.

In one example, the sintering occurs during operating of the engine 20. That is, the sintering step 416 occurs after the article 100 is replaced in the engine 20 and the engine 20 is operated. The article 100 is subjected to high temperatures during the operation of the engine 20, which causes sintering of the repair 300.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of repairing a coating on an article, comprising:

defining a work area surrounding a discontinuity in the coating, the coating including undisturbed bond coat and undisturbed top coat;

removing coating material, including both undisturbed coating and undisturbed bond coat and top coat within the work area;

applying a bond slurry containing bond coat constituents in a carrier fluid to the work area;

curing the bond slurry to form a repaired bond coat;

applying a top slurry containing top coat constituents in a carrier fluid to the work area; and curing the top slurry to form a repaired top coat.

2. The method of claim 1, wherein the removing step includes abrading the work area.

3. The method of claim 1, wherein the repaired bond coat has the same composition as the undisturbed bond coat.

4. The method of claim 1, wherein the repaired bond coat has a different component than the undisturbed bond coat.

5. The method of claim 1, wherein the undisturbed bond coat and the repaired bond coat comprise matrix material, gettering particles, and diffusive particles.

6. The method of claim 5, wherein the repaired bond coat contains a higher concentration of diffusive particles than the undisturbed bond coat.

7. The method of claim 1, wherein the repaired top coat has a different composition than the undisturbed top coat.

8. The method of claim 1, further comprising sintering the repaired bond coat and the repaired top coat.

9. The method of claim 8, wherein the article is a component of a gas turbine engine, and the sintering occurs during operation of the gas turbine engine.

10. The method of claim 8, wherein the sintering occurs at temperatures of at least about 1260 degrees C. (2300 degrees F.).

11. The method of claim 1, further comprising masking the article with masking material having an opening corresponding to the work area after the defining step.

12. The method of claim 11, wherein the masking material includes pre-cut masking material with a pre-cut opening, and further comprising selecting the pre-cut masking material to accommodate the size of the discontinuity.

13. The method of claim 1, wherein the step of applying the bond slurry containing bond coat constituents, the step of applying the top slurry containing top coat constituents, or both, includes pressing the slurry into the article.

14. The method of claim 1, further comprising the step of evaluating the coating to determine a thickness of the undisturbed bond coat, the undisturbed top coat, or both prior to the step of applying the slurry containing bond coat constituents.

15. A method of repairing a coating on an article, comprising:

defining a work area surrounding a discontinuity in the coating, the coating including undisturbed bond coat and undisturbed top coat, and the discontinuity being in the top coat;

removing top coat material including undisturbed top coat material within the work area to reveal undisturbed bond coat;

applying a top slurry containing top coat constituents in a carrier fluid to the work area over the undisturbed bond coat; and curing the top slurry to form a repaired top coat.

16. The method of claim 14, wherein the repaired top coat has a different composition as the undisturbed top coat.

17. The method of claim 14, further comprising masking the article with masking material having an opening corresponding to the work area after the defining step.

18. The method of claim 1, further comprising sintering the repaired top coat.

19. The method of claim 1, further comprising the step of evaluating the coating to determine a thickness of the undisturbed top coat to the step of applying the slurry containing bond coat constituents.

* * * * *